US012062269B2

(12) United States Patent
Napthine

(10) Patent No.: US 12,062,269 B2
(45) **Date of Patent: *Aug. 13, 2024**

(54) SECURITY TAG

(71) Applicant: Sekura Global IP LLP, Colchester (GB)

(72) Inventor: Russell Napthine, Colchester (GB)

(73) Assignee: Sekura Global IP LLP, Colchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,760

(22) Filed: Mar. 24, 2023

(65) Prior Publication Data

US 2023/0237891 A1 Jul. 27, 2023

Related U.S. Application Data

(63) Continuation of application No. 16/774,188, filed on Jan. 28, 2020, now Pat. No. 11,640,754.

(30) Foreign Application Priority Data

Jan. 28, 2019 (GB) .................................... 1901159

(51) Int. Cl.
*G08B 13/24* (2006.01)

(52) U.S. Cl.
CPC ..... *G08B 13/2434* (2013.01); *G08B 13/2442* (2013.01); *G08B 13/2485* (2013.01)

(58) Field of Classification Search
CPC ........... G08B 13/2402; G08B 13/2428; G08B 13/2434; G08B 13/1463; E05B 73/0017
See application file for complete search history.

(56) References Cited

U.S. PATENT DOCUMENTS

| | | | | |
|---|---|---|---|---|
| 6,121,878 A | 9/2000 | Brady et al. | | |
| 2008/0198002 A1* | 8/2008 | Bartholf | G08B 13/2402 | 340/539.13 |

(Continued)

FOREIGN PATENT DOCUMENTS

| | | |
|---|---|---|
| DE | 10 2004 052 543 A1 | 5/2006 |
| EP | 0 352 936 A3 | 1/1990 |
| WO | 2018/129431 A1 | 7/2018 |

OTHER PUBLICATIONS

UK Search Report bearing a mailing date of Jul. 22, 2019 from a corresponding UK patent application (GB 1901159.2), 4 pages.

*Primary Examiner* — Benyam Haile
(74) *Attorney, Agent, or Firm* — Brown & Brown IP Law PLLC

(57) ABSTRACT

A security tag including a flexible member that can be formed into a loop to attach the security tag to an article. A security tag comprises: a main body comprising a casing that comprises a first aperture proximate a first end wall and a second aperture proximate a second end wall; an elongate flexible member, a first end of the flexible member extending through the first aperture; a releasable locking mechanism in the main body and associated with the second aperture, the locking mechanism configured to retain a second end of the flexible member; and two electronic article surveillance sensors within the casing, the sensors on opposite sides of a plane disposed halfway between the first and second apertures. When the second end of the flexible member is retained in the casing by the locking mechanism, a centre of gravity of the main body lies in the plane.

18 Claims, 2 Drawing Sheets

(56) References Cited

U.S. PATENT DOCUMENTS

| | | | | |
|---|---|---|---|---|
| 2013/0098122 | A1 | 4/2013 | Eckert | |
| 2015/0243146 | A1* | 8/2015 | Sayegh | G08B 13/1463<br>340/572.8 |
| 2016/0162775 | A1 | 6/2016 | Zeng | |
| 2020/0043308 | A1 | 2/2020 | Zhang | |

* cited by examiner

SECURITY TAG

CROSS-REFERENCE TO RELATED APPLICATION

This application is a continuation of U.S. patent application Ser. No. 16/774,188, filed Jan. 28, 2020, the entirety of which is incorporated herein by reference.

BACKGROUND

This invention relates to a security tag for use in a retail environment. In particular this invention relates to a security tag including a flexible member or lanyard that can be formed into a loop to attach the security tag to an article.

There are a number of known systems for deterring or preventing theft of articles from a retail environment. Typically these systems include an electronic article surveillance (EAS) tag that is attached to the article or object in a retail store. While the EAS tag is activated, the tag is arranged to trigger an alarm if the tag, and therefore the article, passes between a pair of detection gates, which are typically positioned at the entrance and exit of the retail store.

An acousto-magnetic (AM) EAS tag includes a ferromagnetic or ferrimagnetic amorphous metal strip, which has magnetostrictive properties. Typically this amorphous metal strip will be a ferrite. The detection gates at the entrance and exit of the retail store emit periodic tonal bursts at around 58 kHz. This is the same as the resonant frequency of the amorphous metal strip or ferrite, which causes the amorphous strip to vibrate which leads to a change in its magnetisation. This change in magnetisation induces an AC voltage in a receiver antenna of the detection gate, which triggers an alarm.

When a customer purchases an article having one of these EAS tags attached to it, the tag is deactivated and/or removed so that the alarm is not triggered when that person leaves the retail store. Security tags that are deactivated and removed completely from the article are often referred to as hard tags and are re-usable.

There are a number of different ways of attaching hard tags to articles, and which one is used will typically depend on the type of article being tagged. One known type of tag includes a flexible cable or lanyard that may be formed into a loop to pass around the article or through a part of the article. These tags may be secured to bags, clothing or sports equipment for example. Typically the lanyard is threaded through a hole or gap in the article or around a part of the article, for example through the handle of a bag. The lanyard is then fully engaged with the main body of the tag and the tag is activated. Once activated, the lanyard cannot be removed from the main body of the tag and the lanyard cannot be cut without triggering an alarm.

It is known, however, that thieves may cut through the main body of the tag, rather than through the lanyard, to remove the tag from the article. Alternatively, with AM EAS tags, a thief may break a part of the casing of the main body of the tag to remove the amorphous metal (ferrite) strip.

It is an object of the present invention to provide an improved security device for deterring theft of an object from a retail space.

SUMMARY OF THE INVENTION

According to the present invention there is provided a security tag comprising:

a main body comprising a casing having opposite first and second end walls;

an elongate flexible member for securing around an object, a first end of the flexible member being connected to the main body;

a releasable locking mechanism in the main body, the locking mechanism configured to retain a second end of the flexible member within the casing such that a part of the flexible member external to the casing forms a loop, the locking mechanism being releasable by application of a magnetic force such that the second end of the flexible member can be withdrawn from the casing; and two electronic article surveillance (EAS) sensors housed within the casing, a first one of the sensors being proximate the first end wall of the casing and a second one of the sensors being proximate the second end wall of the casing.

Preferably the casing comprises a first aperture through which a first end section of the flexible member extends and a second aperture with which the locking mechanism is associated, the first aperture being disposed proximate the first end wall and the second aperture being disposed proximate the second end wall.

The first and second apertures are preferably provided in a side wall of the casing, the side wall extending between the first and second end walls.

In preferred embodiments, when the second end of the flexible member is retained in the casing by the locking mechanism, a centre of gravity of the main body lies in a plane extending substantially parallel to at least one of the first and second end walls that is disposed halfway between the first and second apertures.

Preferably a passage extends between the second aperture and the locking mechanism.

The locking mechanism may comprise grip means moveable between a gripping position in which the grip means applies a gripping force to a part of the flexible member and a released position in which the grip means does not grip the flexible member, and wherein the grip means is biased into the gripping position. Preferably the locking mechanism comprises a biasing means configured to apply a force to the grip means in a direction substantially parallel to an axis of the passage. The biasing means preferably comprises a compression spring. The grip means preferably comprises a plurality of grip members configured to move radially inwardly to grip the flexible member and to move radially outwardly to release the flexible member.

The locking mechanism is preferably releasable by application of a magnetic force in a direction substantially parallel to the passage.

Preferably the flexible member comprises a metal cord or wire.

The security tag may further comprise an alarm in the main body.

The security tag may further comprise a control member biased to extend into the passage and arranged to contact a part of the flexible member located within the passage. The control member is preferably moveable by contact with the flexible member between a first position in which a part of the control member extends a first distance into the passage and a second position in which a part of the control member extends a second distance into the passage, the second distance being less than the first distance. Preferably the security tag comprises an alarm and contact between the flexible member and the control member completes a circuit connected to the alarm, such that if the flexible member is severed the alarm is triggered.

In preferred embodiments the security tag further comprises a conductive element or wire housed within the casing and connected to an alarm. A first section of the conductive element is disposed proximate a first side wall of the casing and a second section of the conductive element is disposed proximate a second side wall of the casing, and the conductive element is configured such that if the conductive element is severed the alarm is triggered.

Preferably each of the two EAS sensors operates at a different frequency. In some preferred embodiments a first one of the EAS sensors operates at a frequency of about 58 kHz and a second one of the EAS sensors operates at a frequency of about 8.2 MHz.

BRIEF DESCRIPTION OF THE DRAWINGS

The invention will now be further described by way of example only and with reference to the accompanying drawings, in which.

DETAILED DESCRIPTION

Figure 1:
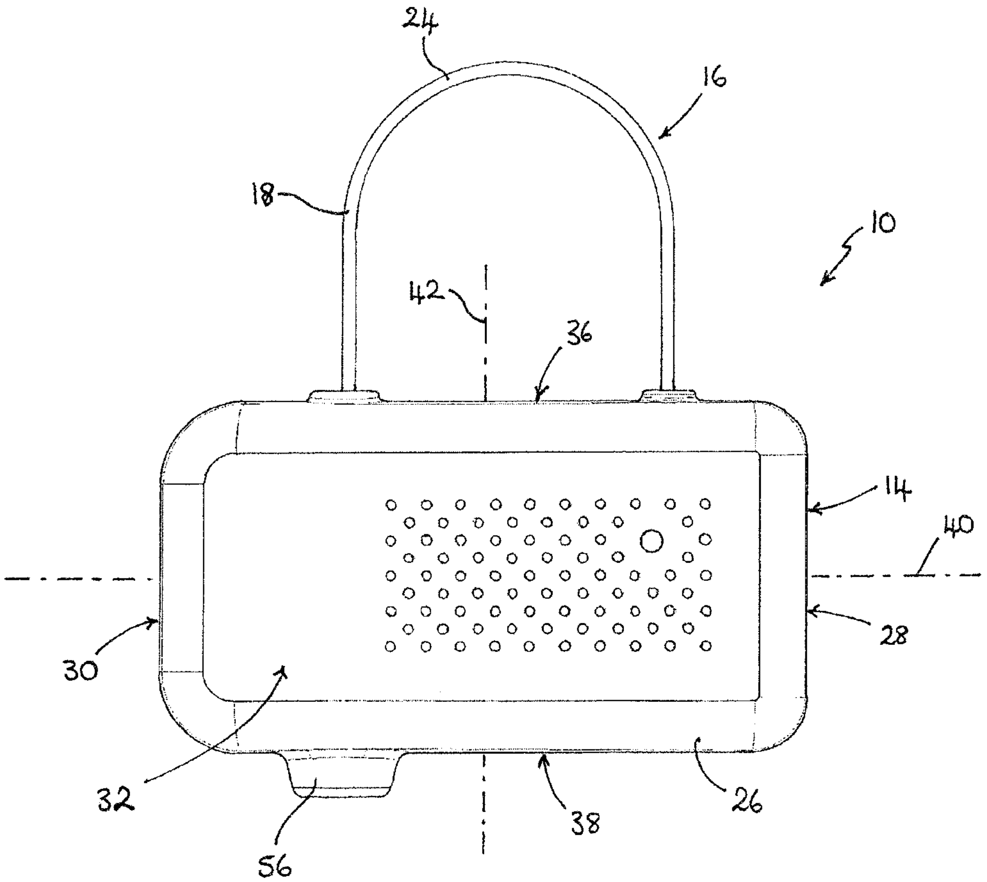
FIG. 1 is a side view of a security tag according to a preferred embodiment of the present invention, the security tag comprising a main body and a flexible lanyard.
Figure 2:
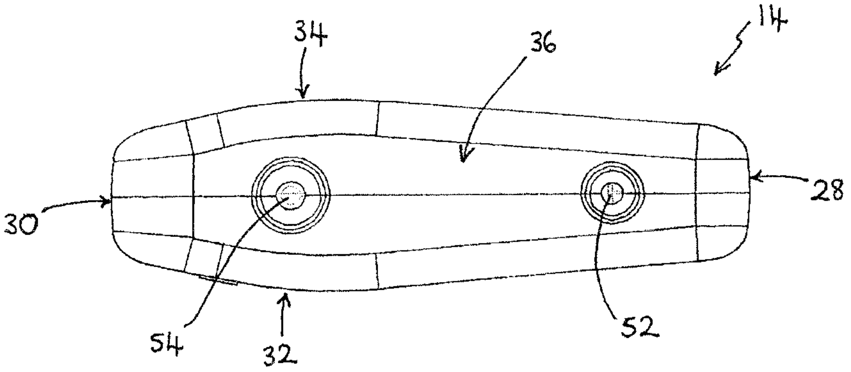
FIG. 2 is a top view of the main body of the security tag of FIG. 1.

A security tag 10 is designed to be releasably attached to an article in a retail store. The security tag 10 includes an electronic article surveillance (EAS) sensor 12 that generates detectable signals. A suitable EAS detector (not shown) is typically located at the exit (and entrance) of the retail store. If an article with a security tag 10 attached is removed from the store and, therefore, passes the detector, the detector detects signals emitted by the EAS sensor and triggers an alarm.

To allow an article to leave the store without triggering the alarm, for example after purchase of the article, the security tag 10 is detached from the article. Typically the tag 10 is detached at the point of sale of the article by a suitable detacher system (not shown).

A security tag 10 according to an embodiment of the present invention comprises a main body 14 and attachment means 16. The attachment means comprises an elongate flexible member 18. The flexible member 18 is configured to form a loop through or around part of an article.

The flexible member 18 extends between first and second ends 20, 22. The flexible member 18 is sufficiently flexible that the flexible member 18 may be bent or curved or formed into a loop 24. The flexible member 18 may be in the form of a lanyard or cable. The flexible member 18 may be a metal cord or wire, and the flexible member may be braided.

In this embodiment the first end 20 of the flexible member 18 is fixedly or permanently attached to the main body 14 such that the first end 20 does not move with respect to the main body 14.

The main body 14 comprises a substantially cuboidal housing or casing 26. The casing comprises first and second end walls 28, 30, first and second side walls 32, 34, and third and fourth side walls 36, 38. In use, the tag 10 will typically be oriented such that the third side wall 36 is a top wall of the main body 14 and the fourth side wall 38 is a bottom wall of the main body 14. In this embodiment a distance between the first and second end walls 28, 30 is greater than a distance between the third and fourth side walls 36, 38. A line extending between the first and second end walls 28, 30 defines a longitudinal axis 40 of the main body 14 of the tag 10. A line extending between the third and fourth side walls 36, 38 defines a transverse axis 42 of the main body 14 of the tag 10, the transverse axis 42 extending perpendicular to the longitudinal axis 40.

The casing 26 surrounds and defines an internal volume 44 of the main body 14 of the tag 10. Within the internal volume 44, and surrounded by the casing 26, is a locking mechanism 46 for receiving the second end 22 of the flexible member 18, circuitry 48 including an alarm 50, and two EAS sensors 12.

One or both of the EAS sensors 12 may be an acousto-magnetic (AM) sensor. In particular, each of the sensors 12 may comprise a ferrimagnetic or ferromagnetic amorphous metal strip having magnetostrictive properties. Preferably the amorphous metal strip is a ferrite. The amorphous metal strip may have a resonant frequency of about 58 kHz. In preferred embodiments one of the EAS sensors 12 is an AM sensor and the other EAS sensor 12 is a radio frequency (RF) sensor. In these embodiments the AM sensor operates at 58 kHz and the RF sensor operates at about 8.2 MHz. In preferred embodiments each of the sensors 12 comprises an elongate strip of amorphous metal having a longitudinal axis, surrounded by a coil. A first one of the sensors **12*a* is disposed within the casing 26 proximate the first end wall 28 of the casing 26. A second one of the sensors 12*b* is disposed within the casing 26 proximate the second end wall 30 of the casing 26. The longitudinal axis of each of the elongate strips is preferably substantially parallel to the transverse axis 42 of the main body 14 of the tag 10**.

The first end 20 of the flexible member 18 is secured to the main body 14 within the internal volume 44 of the main body 14 proximate the first sensor **12*a* and proximate the first end wall 28. The flexible member 18 extends through a first aperture 52 in the third side wall 36 or top wall of the casing 26, proximate the first end wall 28**.

The top wall 36 includes a second aperture 54 disposed proximate the second end wall 30. The second aperture 54 is sized to receive the second end 22 of the flexible member 18. The second aperture 54 may have a larger diameter than the first aperture 52. The locking mechanism 46 within the internal volume 44 of the main body 14 is associated with the second aperture 54 and is arranged to receive the second end 22 of the flexible member 18 when the second end 22 of the flexible member 18 is inserted through the second aperture 54.

The locking mechanism 46 is disposed within the internal volume 44 of the casing 26 proximate the fourth side wall 38 or bottom wall of the casing 26. In this embodiment a part of the locking mechanism 46 is disposed in a protrusion 56 formed in the bottom wall 38 of the casing 26. A passage or bore 58 extends from the second aperture 54 to the locking mechanism 46 so that the locking mechanism 46 is disposed at an end of the passage 58 furthest from the second aperture 54. As such, an axis of the passage 58 is substantially parallel to the transverse axis 42 of the main body 14 of the tag 10. The passage 58 is sized to receive the flexible member 18, and in particular a second end section of the flexible member 18. As such, a diameter of the passage 58 is slightly larger than an external diameter of the flexible member 18. The locking mechanism 46 is configured to automatically grip and retain the second end section of the flexible member 18 such that the second end 22 of the flexible member 18 cannot be withdrawn from the main body 14 of the tag 10 until the locking mechanism 46 is released.

In a released configuration the locking mechanism 46 does not apply a gripping force to the flexible member 18 allowing the second end 22 of the flexible member 18 to be withdrawn from the passage 58.

Figure 3:
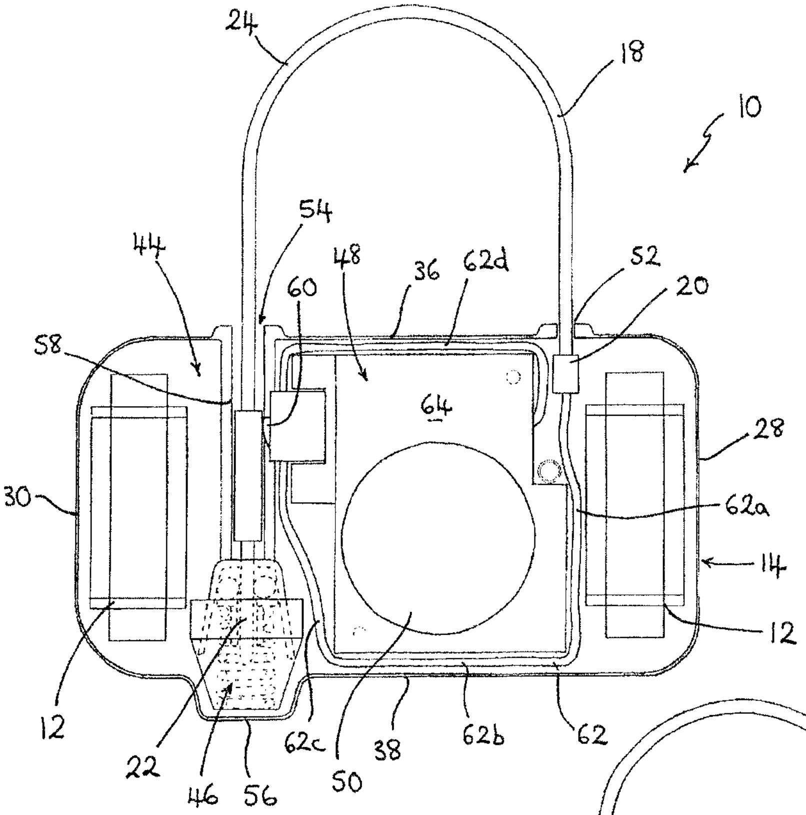
FIG. 3 is a schematic internal view of the security tag of FIG. 1 in an engaged configuration and showing, in particular, the flexible lanyard of the tag engaged with a locking mechanism of the tag.

The locking mechanism 46 may be of any suitable configuration known in the prior art. In this embodiment, the locking mechanism 46 includes a plurality of balls or spheres retained in a cup element. When the flexible member 18 is inserted into the passage 58, the second end 22 of the flexible member 18 extends between the balls so that the balls surround the second end section of the flexible member 18, as illustrated in FIG. 3. The locking mechanism 46 is biased into a first, gripping position or locked configuration in which the balls are urged towards the flexible member 18 by suitable biasing means. In this embodiment the biasing means comprises a biasing member in the form of a spring. The spring urges the balls into a tapered section of the cup element.

Figure 4:
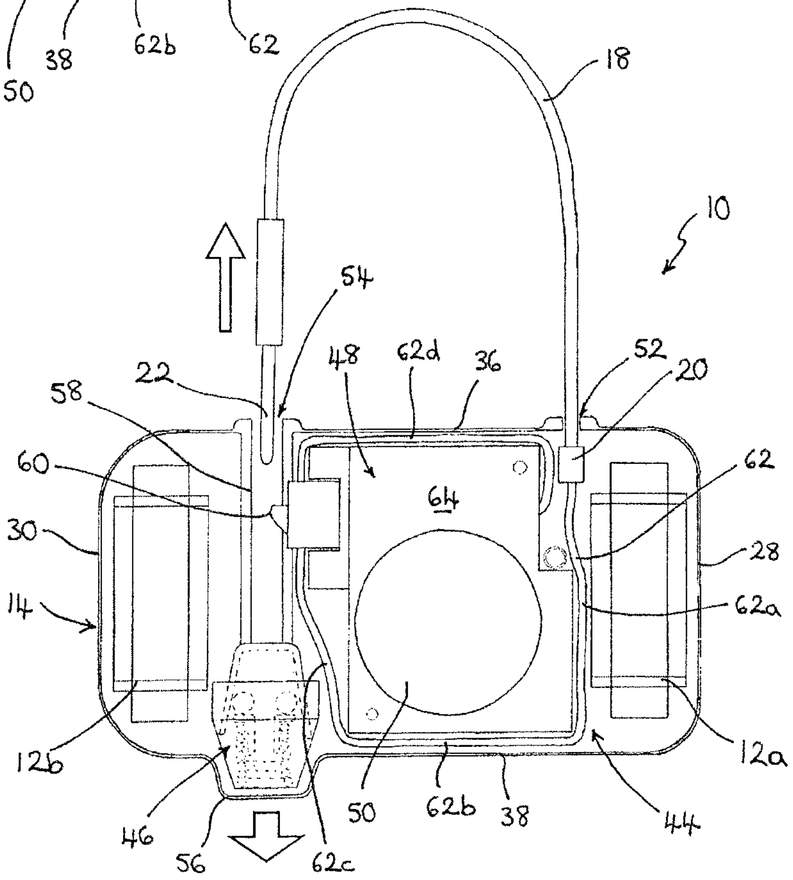
FIG. 4 is a schematic internal view of the security tag of FIG. 1 in a disengaged or open configuration and showing, in particular, the flexible lanyard of the tag disengaged from the locking mechanism.

The locking mechanism 46 is released by application of a magnetic force to the locking mechanism 46. In this embodiment the magnetic force is applied by means of a magnet (not shown) placed against the protrusion 56 in the bottom wall 38 of the casing 26. The magnetic force causes the balls to move in a direction out of the tapered section of the cup element against the biasing force of the spring. In this position, the balls no longer grip the end section of the flexible member 18, allowing the second end 22 of the flexible member 18 to be withdrawn, as illustrated in FIG. 4. In this embodiment, therefore, the locking mechanism 46 is released by application of a magnetic force in a direction substantially parallel to an axis of the passage 58.

In use, therefore, the flexible member 18 is passed around or threaded through a part of an article and the second end 22 of the flexible member 18 is inserted into the second aperture 54 and into the passage 58, such that a bend or loop 24 is formed in the flexible member 18 between the first end 20 of the flexible member 18 and the second aperture 54. The security tag 10 is then in an engaged configuration. When it is desired to remove the tag 10 from the article, the locking mechanism 46 is released by applying a magnetic force to the locking mechanism 46. The second end 22 of the flexible member 18 can then be withdrawn from the passage 58. The security tag 10 is then in a disengaged or open configuration.

As shown most clearly in FIG. 4, the first EAS sensor **12*a* is disposed between the first end 20 of the flexible member 18 and the first end wall 28 of the casing 26. The second EAS sensor 12*b* is disposed between the passage 58 (and locking mechanism 46) and the second end wall 30 of the casing 26**.

An advantageous feature of the security tag 10 is that, when the security tag 10 is in the engaged configuration, the centre of gravity of the main body 14 of the tag 10 lies in a plane extending parallel to the transverse axis 42 of the tag 10 that is disposed substantially halfway between the first and second apertures 52, 54 in a direction parallel to the longitudinal axis 40 of the tag 10. In this way, where possible, when the tag 10 is secured to an article, and is in an engaged configuration, the tag 10 hangs substantially vertically.

In addition to the EAS sensors 12, the security tag 10 includes an alarm 50 which is triggered if a person attempts to cut or remove the tag 10 from an article. The alarm 50 is preferably an audible alarm. The alarm 50 may also comprise a light emitter. The alarm 50 is activated when the second end 22 of the flexible member 18 is inserted into the passage 58 and held by the locking mechanism 46. The alarm 50 is then triggered if the flexible member 18 is cut or otherwise severed, for example if a person attempts to cut the flexible member 18 to remove the tag 10 from an article.

In these embodiments the security tag 10 comprises a control member or button 60. The control member 60 is connected to the circuitry 48 within the tag 10 which, in turn, is connected to the alarm 50. The control member 60 is disposed in the internal volume 44 of the casing 26 and is associated with the passage 58 such that, when the flexible member 18 is disposed through the passage 58, a part of the flexible member 18 within the passage 58 contacts the control member 60.

The control member 60 is moveable between a first position in which a part of the control member 60 extends a first distance into the passage 58 (shown in FIG. 4) and a second position in which a part of the control member 60 extends a second distance into the passage 58 (shown in FIG. 3), the second distance being less than the first distance. The control member 60 is biased into the first position. The control member 60 is moved into and retained in the second position by means of contact with the flexible member 18 in the passage 58.

While the flexible member 18 is disposed in the passage 58, the control member 60 is held in the second position by the flexible member 18 and the alarm 50 is activated. A section of the flexible member 18, extending between the control member 60 and the first end 20 of the flexible member 18, completes a circuit that includes the alarm 50. If the flexible member 18 is severed in this section, which includes the loop 24 around or through the article, the alarm 50 is triggered. Upon removal or withdrawal of the flexible member 18 from the passage 58, the flexible member 18 no longer contacts the control member 60 and the control member 60 automatically returns to the first position. With the control member 60 in the first position the alarm 50 is not activated.

The circuitry 48 further comprises a wire 62 or other conductive track or path that extends from or is connected to the first end 20 of the flexible member 18. This wire 62 is part of the circuit including the control member 60 and the alarm 50 described above. The wire 62 follows a circuitous path through a central region of the internal volume 44 of the main body 14 of the tag 10. In particular, a first section **62*a* of the wire 62 extends from the first end 20 of the flexible member 18 proximate the top wall 36 of the casing 26 towards the bottom wall 38 of the casing 26. A second section 62*b* of the wire 62 extends substantially parallel to and proximate the bottom wall 38 of the casing 26. This second section 62*b* extends towards the locking mechanism 46 and the passage 58. A third section 62*c* of the wire 62 extends from a region proximate the bottom wall 38 of the casing 26 towards the top wall 36 of the casing 26. The third section 62*c* of the wire 62 is disposed adjacent the passage 58 and locking mechanism 46. A fourth section 62*d* of the wire 62 extends substantially parallel to and proximate the top wall 36 of the casing 26. This fourth section 62*d* extends back towards the first end 20 of the flexible member 18**.

In the illustrated embodiment the wire 62 follows a path around a printed circuit board 64 on which the circuitry 48 is provided.

Configuring the wire 62 in this way has the advantage that if someone tries to cut through the main body 14 of the tag 10 to remove the tag 10 from an article there is a high likelihood that they will cut through a section of the wire 62. If a section of the wire 62 is cut, or otherwise broken, the alarm 50 is triggered.

While a preferred embodiment of a security tag of the present invention has been illustrated in the accompanying drawings and described above, it will be appreciated that further embodiments of the invention can also be contemplated without departing from the scope of the invention as defined in the appended claims.

The invention claimed is:

1. A security tag comprising:

a main body comprising a casing having opposite first and second end walls, and the casing comprising a first aperture disposed proximate the first end wall and a second aperture disposed proximate the second end wall;

an elongate flexible member for securing around an object, a first end of the flexible member extending through the first aperture and being connected to the main body;

a releasable locking mechanism in the main body and associated with the second aperture, the locking mechanism configured to retain a second end of the flexible member within the casing such that a part of the flexible member external to the casing forms a loop, the locking mechanism being releasable by application of a magnetic force such that the second end of the flexible member can be withdrawn from the casing; and two electronic article surveillance (EAS) sensors housed within the casing, a first one of the sensors being proximate the first end wall of the casing and a second one of the sensors being proximate the second end wall of the casing, such that the first and second sensors are on opposite sides of a plane that is between the first and second end walls and that is disposed halfway between the first and second apertures, and such that when the second end of the flexible member is retained in the casing by the locking mechanism, a centre of gravity of the main body lies in the plane disposed halfway between the first and second apertures.

2. A security tag as claimed in claim 1, wherein a longitudinal axis of the main body is defined extending between the first and second end walls, and wherein each of the sensors comprises an elongate strip of amorphous metal having a longitudinal axis surrounded by a coil, the longitudinal axis of each of the elongate strips being substantially perpendicular to the longitudinal axis of the main body.

3. A security tag as claimed in claim 1, wherein the first and second apertures are provided in a side wall of the casing, the side wall extending between the first and second end walls.

4. A security tag as claimed in claim 1, wherein the first end of the flexible member is secured to the main body within the internal volume of the main body proximate the first sensor and proximate the first end wall.

5. A security tag as claimed in claim 1, wherein a passage extends between the second aperture and the locking mechanism.

6. A security tag as claimed in claim 5, wherein the locking mechanism comprises grip means moveable between a gripping position in which the grip means applies a gripping force to a part of the flexible member and a released position in which the grip means does not grip the flexible member, and wherein the grip means is biased into the gripping position.

7. A security tag as claimed in claim 6, wherein the locking mechanism comprises a biasing means configured to apply a force to the grip means in a direction substantially parallel to an axis of the passage.

8. A security tag as claimed in claim 7, wherein the biasing means comprises a compression spring.

9. A security tag as claimed in claim 6, wherein the grip means comprises a plurality of grip members configured to move radially inwardly to grip the flexible member and to move radially outwardly to release the flexible member.

10. A security tag as claimed in claim 5, wherein the locking mechanism is releasable by application of a magnetic force in a direction substantially parallel to the passage.

11. A security tag as claimed in claim 5, further comprising a control member biased to extend into the passage and arranged to contact a part of the flexible member located within the passage.

12. A security tag as claimed in claim 11, wherein the control member is moveable by contact with the flexible member between a first position in which a part of the control member extends a first distance into the passage and a second position in which a part of the control member extends a second distance into the passage, the second distance being less than the first distance.

13. A security tag as claimed in claim 11, wherein the security tag comprises an alarm and wherein contact between the flexible member and the control member completes a circuit connected to the alarm, such that if the flexible member is severed the alarm is triggered.

14. A security tag as claimed in claim 1, wherein the flexible member comprises a metal cord or wire.

15. A security tag as claimed in claim 1, further comprising an alarm in the main body.

16. A security tag as claimed in claim 1, further comprising a conductive element housed within the casing and connected to an alarm, a first section of the conductive element disposed proximate a first side wall of the casing and a second section of the conductive element disposed proximate a second side wall of the casing, the conductive element being configured such that if the conductive element is severed the alarm is triggered.

17. A security tag as claimed in claim 1, wherein each of the two EAS sensors operates at a different frequency.

18. A security tag as claimed in claim 17, wherein a first one of the EAS sensors operates at a frequency of about 58 kHz and a second one of the EAS sensors operates at a frequency of about 8.2 MHz.

* * * * *